(12) United States Patent
Yamashita

(10) Patent No.: US 9,141,185 B2
(45) Date of Patent: Sep. 22, 2015

(54) INPUT DEVICE

(71) Applicant: ALPS ELECTRIC CO., LTD., Ota-ku, Tokyo (JP)

(72) Inventor: Tatsumaro Yamashita, Tokyo (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 90 days.

(21) Appl. No.: 13/950,946

(22) Filed: Jul. 25, 2013

(65) Prior Publication Data
US 2014/0078044 A1 Mar. 20, 2014

(30) Foreign Application Priority Data
Sep. 19, 2012 (JP) ................................. 2012-205498

(51) Int. Cl.
G09G 5/00 (2006.01)
G06F 3/00 (2006.01)
H04N 7/18 (2006.01)
H04N 5/372 (2011.01)
G06F 3/01 (2006.01)
G06T 11/60 (2006.01)
G06F 3/048 (2013.01)
G06F 3/03 (2006.01)
B60K 35/00 (2006.01)
G06F 3/041 (2006.01)
G06F 3/042 (2006.01)

(52) U.S. Cl.
CPC ................ *G06F 3/005* (2013.01); *B60K 35/00* (2013.01); *G06F 3/011* (2013.01); *G06F 3/016* (2013.01); *G06F 3/0317* (2013.01); *G06F 3/048* (2013.01); *G06F 3/0416* (2013.01); *G06F 3/0425* (2013.01); *G06T 11/60* (2013.01); *H04N 5/372* (2013.01); *H04N 7/18* (2013.01); *G06F 2203/04106* (2013.01); *H04N 7/183* (2013.01)

(58) Field of Classification Search
None
See application file for complete search history.

(56) References Cited

U.S. PATENT DOCUMENTS

2007/0061068 A1* 3/2007 Okamoto et al. ............. 701/208
2008/0232198 A1* 9/2008 Hayasaka et al. ............... 367/99

FOREIGN PATENT DOCUMENTS

JP 2005-274409 10/2005

* cited by examiner

Primary Examiner — Muhammad N Edun
(74) Attorney, Agent, or Firm — Hunton & Williams LLP

(57) ABSTRACT

An input device includes an operation panel that is installed inside a vehicle and is operated by an operating part; a CCD camera that is disposed inside the vehicle to image at least a front side of the operation panel; and a control unit that predicts an action of the operating part based on image information of the CCD camera and performs operation assistance on the operation panel.

18 Claims, 19 Drawing Sheets

INPUT DEVICE

CLAIM OF PRIORITY

This application contains subject matter related to and claims the benefit of Japanese Patent Application No. 2012-205498 filed on Sep. 19, 2012, the entire contents of which is incorporated herein by reference.

BACKGROUND OF THE DISCLOSURE

1. Field of the Disclosure

The present disclosure relates to an input device that performs operation assistance on an operation panel installed in a vehicle.

2. Description of the Related Art

Japanese Unexamined Patent Application Publication No. 2005-274409 discloses a car navigation device. The car navigation device disclosed in Japanese Unexamined Patent Application Publication No. 2005-274409 includes image determination means configured to identify whether an operator of an input device is a driver or a passenger on a front passenger seat using a camera installed in a vehicle or based on a photographed image of the camera. When it is identified that the operator is the driver while the vehicle travels, control is performed such that an operation is invalidated.

According to Japanese Unexamined Patent Application Publication No. 2005-274409, when an arm is shown in the photographed image, whether the operator is the driver or the passenger on the front passenger seat is identified based on the shape of the like of an arm region.

According to Japanese Unexamined Patent Application Publication No. 2005-274409, whether a key input from an operation panel is detected, and whether the operator is the driver or the passenger on the front passenger seat is determined based on the shape or the like of the arm region shown in a camera image by using the key input as a trigger.

In Japanese Unexamined Patent Application Publication No. 2005-274409, operability on the operation panel is not changed from the related art. That is, for example, when the operator is the passenger on the front passenger seat, the operator touches the operation panel to perform an input, as in the related art. Therefore, satisfactory operability or fast operability may not be obtained, compared to the related art.

In Japanese Unexamined Patent Application Publication No. 2005-274409, when the operator is the driver, the control is performed such that the operation is invalidated using the key input as a trigger. Therefore, determination whether to invalidate the operation may not be made on time, and there is a concern that a problem may occur in safety.

Further, in Japanese Unexamined Patent Application Publication No. 2005-274409, since the key input first has to be performed to invalidate an operation, the operation is unnecessarily performed.

These and other drawbacks exist.

SUMMARY OF THE DISCLOSURE

Embodiments of the present disclosure provide an input device capable of improving operability on an operational panel or safety while a vehicle travels, compared to the related art, by performing operation assistance on the operation panel based on action prediction of an operating part.

According to an exemplary embodiment, an input device includes: an operation panel that is installed inside a vehicle and is operated by an operating part; an imaging element that is disposed inside the vehicle to image at least a front side of the operation panel; and a control unit that predicts an action of the operating part based on image information of the imaging element and performs operation assistance on the operation panel.

Thus, the input device includes the control unit capable of predicting an action of the operating part on the operation panel based on the image information imaged by the imaging element. And, the operation assistance on the operation panel can be performed based on the action prediction of the operating part. Accordingly, since the operation assistance can be performed at a front position at which an input operation is performed on the operation panel, it is possible to obtain quick operability, comfortable operability, and operability different from that of the related art.

Since the input device according to various embodiments is installed inside a vehicle, the above-described fast operability and comfortable operability, the operation restriction, or the like can result in an improvement in the safety.

According to an exemplary embodiment, the action prediction of the operating part is performed, and the input operation control is performed based on the action prediction. The input operation control is not performed using a key input as a trigger, as in Japanese Unexamined Patent Application Publication No. 2005-274409, and an unnecessary action can be omitted compared to the related art, which also results in an improvement in the above-described safety.

According to an exemplary embodiment, an operation position at which the action is predicted on the operation panel may be highlighted and displayed by the operation assistance of the control unit.

In this case, a display part may be displayed on the operation panel and the display part located at the operation position may be highlighted and displayed by the operation assistance of the control unit.

According to an exemplary embodiment, the plurality of display parts may be arranged on the operation panel. When the operating part approaches one of the display parts, the action may be predicted and the display part which the operating part approaches may be configured to be highlighted and displayed. At this time, by arranging the plurality of display parts in a lateral direction perpendicular to a height direction of the operation panel, the action prediction of the operating part can be performed easily. Thus, the operation assistance can be performed with high accuracy.

According to an exemplary embodiment, the control unit may specify an action detection region divided into a plurality of partitions based on the image information, predict the action based on entrance of the operating part into a predetermined partition located on a side of the operation panel in the action detection region, and perform the operation assistance. Thus, control can be performed easily such that the timing at which the operation assistance is performed is substantially uniform. The load on the control unit performing the operation assistance can be reduced by performing the operation assistance based on the entrance of the operating part into the partition close to the operation panel. Thus, it is possible to improve the accuracy with which the operation assistance is performed.

According to an exemplary embodiment, the control unit may be able to identify whether an operator on the operation panel is a driver or a passenger other than the driver based on an entrance position of the operating part into the action detection region, and perform control such that the operation assistance on the operation panel differs according to the operator. In this case, the control unit may perform control such that the operation assistance is performed only when the control unit identifies that the operator is a passenger on a front passenger seat. The control unit may restrict an input operation on the operation panel more when identifying that the operator is the driver than when the operator is the passenger on the front passenger seat. The control unit performs the operation assistance by preferring the action prediction of the passenger on the front passenger seat, when the control unit identifies that the operator is either of the driver and the passenger on the front passenger seat.

According to an exemplary embodiment, the control unit may be able to identify a height position of the operating part, and thus may predict the action on the operation panel of the operating part based on the height position of the operating part and perform the operation assistance.

According to the aspect of the invention, the action may be predicted based on vector information regarding the operating part. Thus, the action prediction can be performed easily and smoothly.

According to an exemplary embodiment, the action may be predicted by obtaining coordinates of a contour of a hand which is the operating part, calculating a position of a finger from the coordinates, and tracking a movement trajectory of the finger. By using the movement trajectory of the finger, it is possible to perform the more detailed action prediction.

According to an exemplary embodiment, the operation assistance on the operation panel can be performed based on the action prediction of the operating part. Accordingly, since the operation assistance on the operation panel can be performed at a front position at which an input operation is performed on the operation panel, it is possible to obtain operability different from that of the related art, quick operability, and comfortable operability.

Since the input device is installed inside a vehicle, the above-described fast operability and comfortable operability, the operation restriction, or the like can result in the improvement in the safety.

According to various embodiments, the action prediction of the operating part is configured to be performed. The input operation control is not performed using a key input as a trigger, as in Japanese Unexamined Patent Application Publication No. 2005-274409, and an unnecessary action can be omitted compared to the related art, which also results in an improvement in the above-described safety.

DETAILED DESCRIPTION OF THE DISCLOSURE

The following description is intended to convey a thorough understanding of the embodiments described by providing a number of specific embodiments and details involving an input device. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
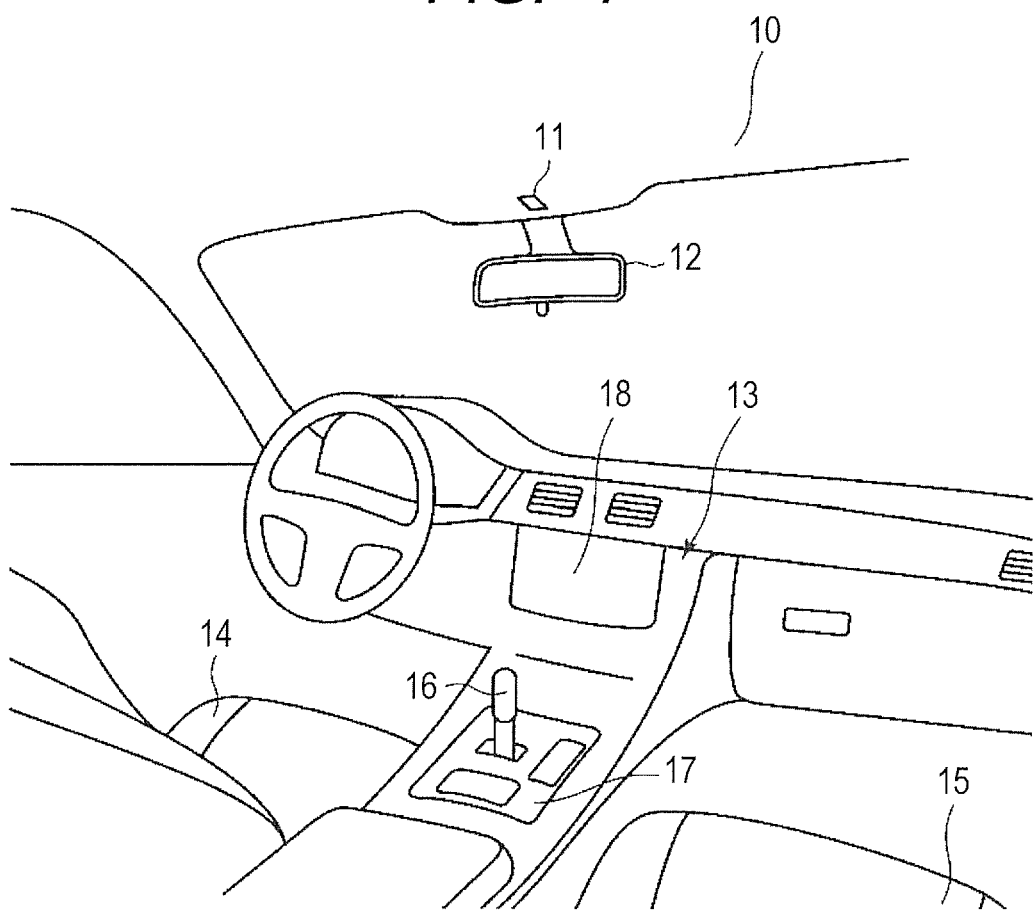
FIG. 1 is a partial schematic diagram illustrating the inside of a vehicle equipped with an input device according to an exemplary embodiment.
Figure 2:
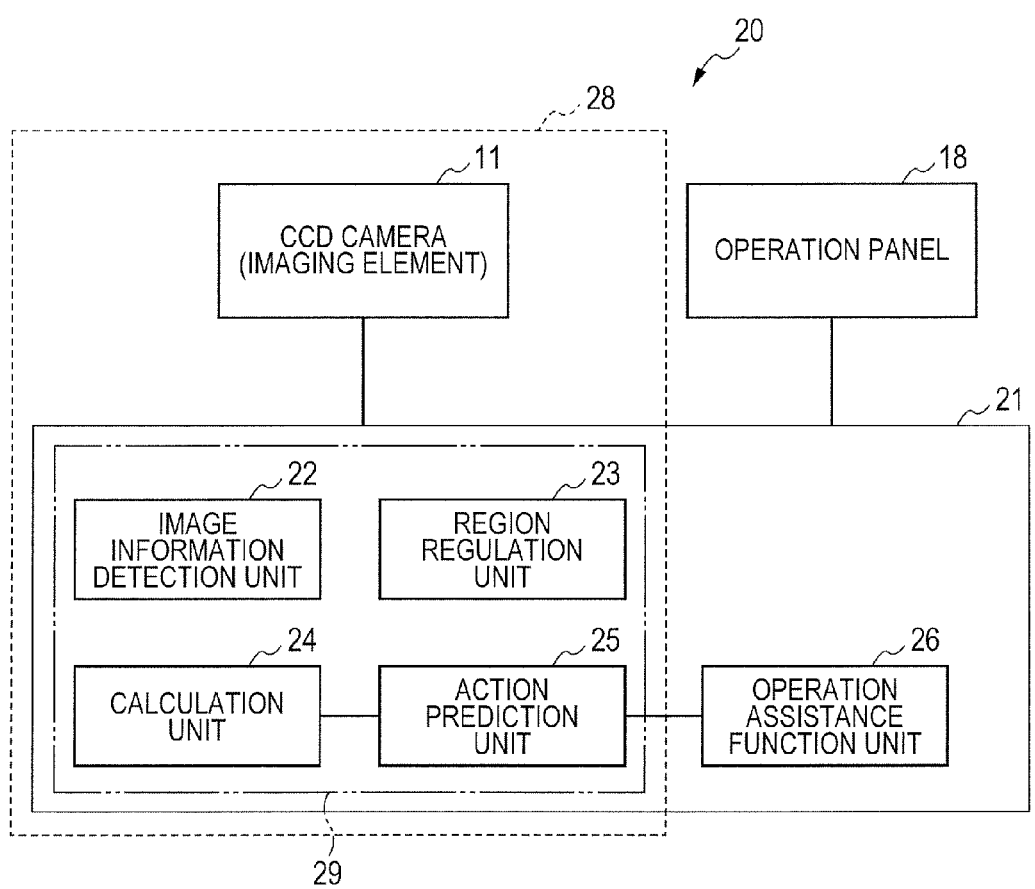
FIG. 2 is a block diagram illustrating the input device according to an exemplary embodiment.
Figure 3:
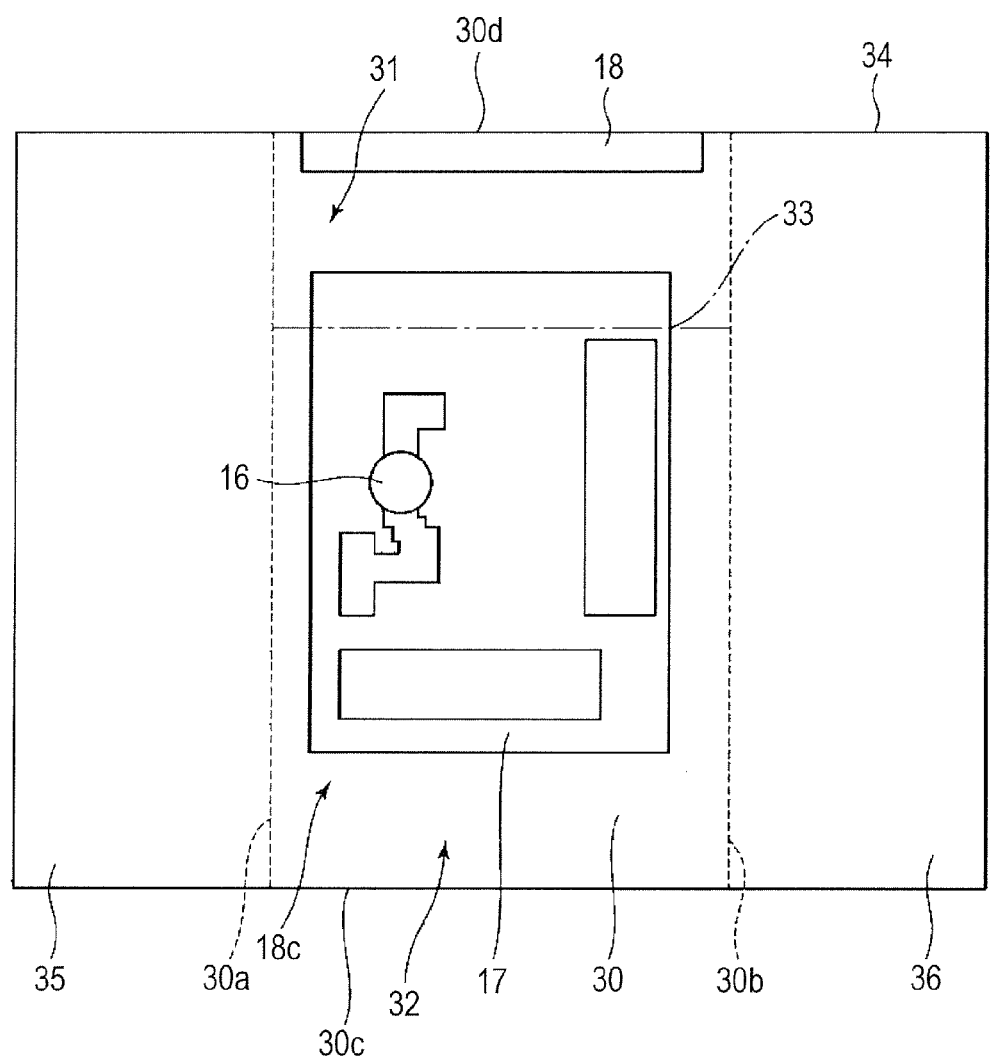
FIG. 3 is a schematic diagram illustrating an image photographed by a CCD camera (imaging element) according to an exemplary embodiment.
Figure 4A:
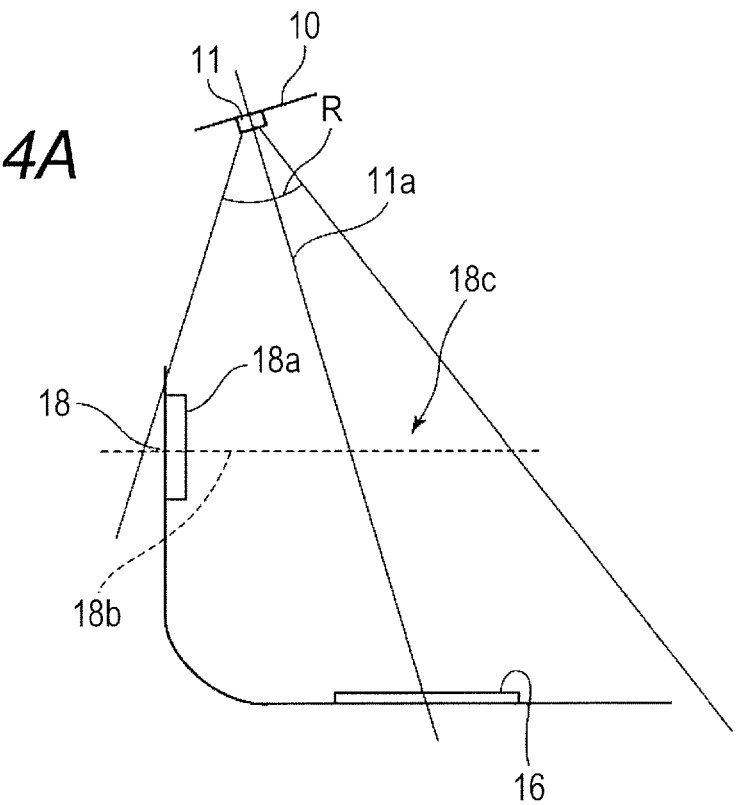
FIG. 4A is a schematic diagram illustrating an imaging element, an operation panel, and an image range photographed by the imaging element, when viewed from a lateral side according to an exemplary embodiment.
Figure 4B:
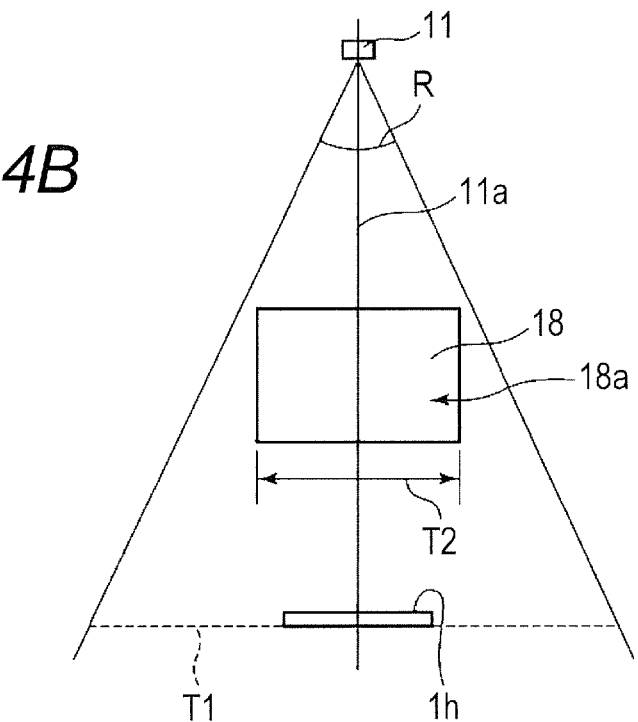
FIG. 4B is a schematic diagram illustrating the imaging element, the operation panel, and the image range photographed by the imaging element, when viewed from a front side according to an exemplary embodiment.

FIG. 1 is a partial schematic diagram illustrating the inside of a vehicle equipped with an input device according to an embodiment. FIG. 2 is a block diagram illustrating the input device according to the embodiment. FIG. 3 is a schematic diagram illustrating an image photographed by a CCD camera (imaging element). FIG. 4A is a schematic diagram illustrating an imaging element, an operation panel, and an image range photographed by the imaging element, when viewed from a lateral side. FIG. 4B is a schematic diagram illustrating the imaging element, the operation panel, and the image range photographed by the imaging element, when viewed from a front side.

FIG. 1 illustrates the vicinity of an in-vehicle anterior row of a vehicle. The vehicle in FIG. 1 is a left-hand handle vehicle. However, an input device according to the embodiment is applicable also to a right-hand drive vehicle.

As illustrated in FIG. 1, a CCD camera (imaging element) 11 may be mounted on a ceiling 10 in the vehicle. In FIG. 1, the CCD camera 11 may be disposed near a rear-view mirror 12. As long as an image photographed by the CCD camera 11 shows at least the front side of the operation panel 18, the installation position of the CCD camera 11 may not be particularly limited. The CCD camera 11 may be used, but an action of an operating part can be detected even during the night when a camera capable of detecting an infrared ray may be used.

As illustrated in FIG. 1, a central operation unit 17 or an operation panel 18 including a shift operating part 16 disposed at a position between a driver seat 14 and a front passenger seat 15 may be disposed in a center console 13.

The operation panel 18 may be, for example, an electrostatic capacitance touch panel and can display a map of a car navigation device, a music reproduction screen, or the like. An operator is assumed to perform an input operation with his or her finger or the like directly on a screen of the operation panel 18.

As illustrated in FIG. 4A, the CCD camera 11 may be mounted on the ceiling 10 and installed at a position at which at least the front side of the operation panel 18 is imaged. Here, the front side of the operation panel 18 may be a direction 18b perpendicular to a screen 18a of the operation panel 18 and may indicate a spatial region 18c on a side on which an input operation is performed on the operation panel 18 with a finger or the like.

A numeral 11a illustrated in FIGS. 4A and 4B denotes a central axis (optical axis) of the CCD camera 11 and R denotes an imaging range.

As illustrated in FIG. 4A, when the imaging range R is viewed horizontally (from the lateral side), the operation panel 18 and the spatial region 18c located on the front side of the operation panel 18 are shown in the imaging range R. As illustrated in FIG. 4B, when the imaging range R is viewed from the front side, a width (the shown largest width of image information) T1 of the imaging range R is larger than a width T2 of the operation panel 18.

As illustrated in FIG. 2, an input device 20 according to this embodiment may include the CCD camera (imaging element) 11, the operation panel 18, and a control unit 21.

As illustrated in FIG. 2, the control unit 21 may include an image information detection unit 22, a region regulation unit 23, a calculation unit 24, an action prediction unit 25, and an operation assistance function unit 26.

Here, in FIG. 2, one control unit 21 is collectively illustrated. However, for example, a plurality of control units 21 may be provided. The image information detection unit 22, the region regulation unit 23, the calculation unit 24, the action prediction unit 25, and the operation assistance function unit 26 illustrated in FIG. 2 may be divided and embedded in the plurality of control units.

That is, how to embed the image information detection unit 22, the region regulation unit 23, the calculation unit 24, the action prediction unit 25, and the operation assistance function unit 26 can be appropriately selected.

An action prediction device 28 may be configured to include the CCD camera (imaging element) 11 and the control unit 29 including the image information detection unit 22, the region regulation unit 23, the calculation unit 24, and the action prediction unit 25 illustrated in FIG. 2. The action prediction device 28 may be embedded in the vehicle and a vehicle system capable of transmitting and receiving a signal to and from the operation panel 18 is included in the input device 20.

The image information detection unit 22 may acquire image information imaged by the CCD camera 11. Here, the image information may be electronic information regarding an image obtained through photography. FIG. 3 is a diagram illustrating a screen 34 imaged by the CCD camera 11. As illustrated in FIG. 3, the operation panel 18 and the spatial region 18c on the front side of the operation panel 18 are shown on the screen 34. The central operation unit 17 in which the shift operating part 16 and the like are disposed is shown on the front side of the operation panel 18. Both left and right regions 35 and 36 of the operation panel 18 and the central operation unit 17 are also shown on the screen 34 of FIG. 3. The left region 35 may be a driver seat side region and the right region 36 may be a front passenger seat side region. In FIG. 3, images shown on both the left and right regions 35 and 36 are not illustrated. A kind of CCD camera 11, the number of pixels, or the like is not particularly limited.

The region regulation unit 23 illustrated in FIG. 2 may specify a region to be used to track a movement trajectory of an operating part and make an action prediction of the operating part based on the image information acquired from the CCD camera 11.

The region regulation unit 23 may specify an image center region located on the front side of the operation panel 18 as an action detection region 30 on the screen 34 illustrated in FIG. 3. That is, the action detection region 30 may be a region surrounded by a plurality of sides 30a to 30d, and both left and right regions 35 and 36 may be separated by the action detection region 30. The boundary lines (sides) 30a and 30b between the action detection region 30 and both left and right regions 35 and 36 illustrated in FIG. 3 may be indicated by dotted lines. In FIG. 3, the sides 30c and 30d may be set as end portions in the front and rear directions of the screen 34. However, the sides 30c and 30d may be disposed inside the screen 34.

The entire screen 34 illustrated in FIG. 3 may be set as the action detection region 30. However, in this case, an amount of calculation consumed for the tracking of the movement trajectory or the action prediction of an operating part may increase, thereby causing delay of the action prediction or short life span of the device. Further, production cost may increase to enable a large amount of calculation. Accordingly, the entire screen 34 may not be used and it may be suitable to use a restricted range as the action detection region 30.

In the form illustrated in FIG. 3, the action detection region 30 may be divided into two partitions 31 and 32. A boundary line 33 between the partitions 31 and 32 is indicated by a one-dot chain line. When the action detection region 30 is divided into a plurality of partitions, how to divide the action detection region 30 can be arbitrarily determined. The action detection region 30 may be divided into the number of partitions greater than 2. Further, the partition 31 can be located closer to the operation panel 18. Since an action state of an operating part in the partition 31 is important to the action prediction of the operating part and the execution of the operation assistance of the operation panel 18, an execution timing of the operation assistance can finely be determined by dividing the inside of the partition 31 in more detail.

Hereinafter, the partition 31 is referred to as a first partition and the partition 32 is referred to as a second partition. As illustrated in FIG. 3, the first partition 31 may include the operation panel 18 inside the image and may be a region closer to the operation panel 18 than the second partition 32.

The calculation unit 24 illustrated in FIG. 2 may be a unit that calculates movement trajectory of an operating part within the action detection region 30. The calculation method may not be particularly limited. However, for example, the movement trajectory of the operating part can be calculated according to the following method.

Figure 5A:
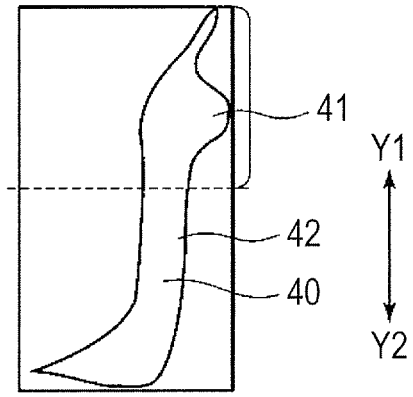
FIGS. 5A to 5D are schematic diagrams illustrating a step of estimating a part of a hand according to an exemplary embodiment.

In FIG. 5A, information regarding a contour 42 of an arm 40 and a hand 41 may be detected. When the contour 42 is comprehended, the size of an image captured by the CCD camera 11 may be decreased to reduce the amount of calculation, and then a process of converting the image into a monochrome image may be performed to perform a recognition process. At this time, the recognition of the operating part can be performed with high accuracy using the detailed image. In an exemplary embodiment, however, the amount of calculation may be reduced by decreasing the size of the image so that a quick process can be performed. Thereafter, after the image may be converted into the monochrome image, the operating part may be detected based on a change in luminance. When an infrared detection camera is used, it may not be necessary to perform the process of converting the image into the monochrome image. Thereafter, for example, a motion vector may be detected by calculating an optical flow using a previous frame and a current frame. At this time, the motion vector may be averaged to 2×2 pixels in order to reduce the influence of noise. When the motion vector has a length equal to or greater than a predetermined vector length (amount of movement), as illustrated in FIG. 5A, the contour 42 from the arm 40 to the hand 41 shown within the action detection region 30 is detected as an operating part.

Figure 5B:
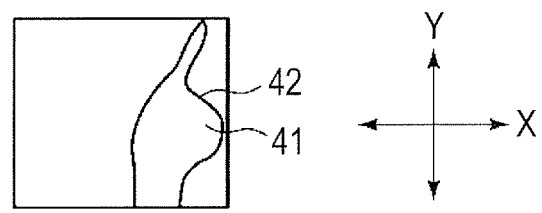
Figure 5C:
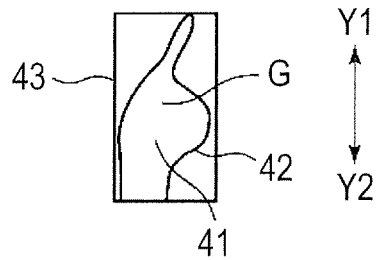

Next, as illustrated in FIG. 5A, a longitudinal length (Y1-Y2) of the image may be restricted. As illustrated in FIG. 5B, an image may be cut out to estimate a region of the hand 41. At this time, the size of each portion of the operating part may be calculated from the contour 42 and a region with a value equal to or greater than a determined value is set as an effective region. The reason for setting the lower limit is that the arm may be excluded using the fact that the width of a hand is generally larger than that of an arm. Further, the reason for not setting the upper limit is that a motion vector may be produced in a considerable area when a body part is also imaged within the action detection region 30, and thus the contour of the body part may not be detected in some cases when the upper limit is set. Then, a region circumscribed by the contour 42 may be detected within the effective region. For example, in FIG. 5B, the XY coordinates forming the entire contour 42 may be investigated, the minimum and maximum values of the X coordinates may be calculated, and the width (the length in the X direction) of the effective region may be reduced, as illustrated in FIG. 5C. By doing so, a minimum rectangular region 43 circumscribed by the contour 42 may be detected and it may be determined whether the longitudinal length (Y1-Y2) of the minimum rectangular region 43 (effective region) is equal to or less than a predetermined threshold value. When the longitudinal length of the minimum rectangular region 43 is equal to or less than the predetermined threshold value, a centroid G of the effective region may be calculated.

Figure 5D:
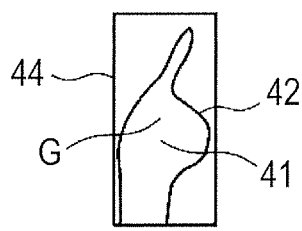

Conversely, when the longitudinal length (Y1-Y2) of the minimum rectangular region 43 (effective region) is equal to or greater than the predetermined threshold value, a longitudinal length which is the lower limit size of the arm is restricted from the Y1 side within a predetermined length range from the Y1 side and an image may be cut out (FIG. 5D). A minimum rectangular region 44 circumscribed by the contour 42 may be detected in the more cut-out image, and a region obtained by enlarging the minimum rectangular region 44 by a few pixels in all of the directions may be set as a hand estimation region. By setting the enlarged region as the hand estimation region, the region of the hand 41 excluded unintentionally during the process of detecting the contour 42 can be recognized again. The above-described process of determining the effective region is performed again in the hand estimation region. When the longitudinal length of an effective region is equal to or less than a predetermined threshold value, the center of the effective region may be determined as the centroid G of the hand 41. The method of calculating the centroid G is not limited to the above-described method, but the centroid G may be also calculated according to an algorithm present from the related art. However, due to the action prediction of an operating part performed while a vehicle travels, quick calculation of the centroid G may be necessary and very high accuracy of the position of the calculated centroid G may not be necessary. In particular, it is important to continuously calculate a motion vector at a position determined as the centroid G. By using this motion vector, the action prediction can reliably be performed even in a case it is difficult to comprehend the shape of a hand which is an operating part, for example, in a circumstance in which a state of the surrounding illumination is successively changed. In the above-described process, the hand and the arm can reliably be distinguished from each other using two pieces of the information regarding the contour 42 and the information regarding the region circumscribed by the contour 42.

During the detection of the above-described motion vector, the motion vector of the centroid G of a moving part (herein, the hand 41) can be calculated and the motion vector of the centroid G can be obtained as the movement trajectory of the moving part.

Based on the movement trajectory of the operating part, the action prediction unit 25 illustrated in FIG. 2 predicts subsequent position which the operating part reaches. For example, the action prediction unit 25 predicts a position which the operating part reaches on the screen 18a of the operation panel 18, when the operating part continues to move, depending on whether the movement trajectory of the operating part is straight toward the operation panel 18 or the movement trajectory is obliquely inclined with respect to the operation panel 18.

The operation assistance function unit 26 illustrated in FIG. 2 may perform operation assistance on the operation panel 18 based on the action prediction of the operating part. In this embodiment, the "operation assistance" refers to control and adjustment of an input operation or a display form or the like of an input operation position so that satisfactory operability or high safety can be ensured. A specific example of the operation assistance will be described below.

Hereinafter, steps from acquisition of image information to execution of the operation assistance will be described with reference to the flowchart of FIG. 6A.

Figure 6A:
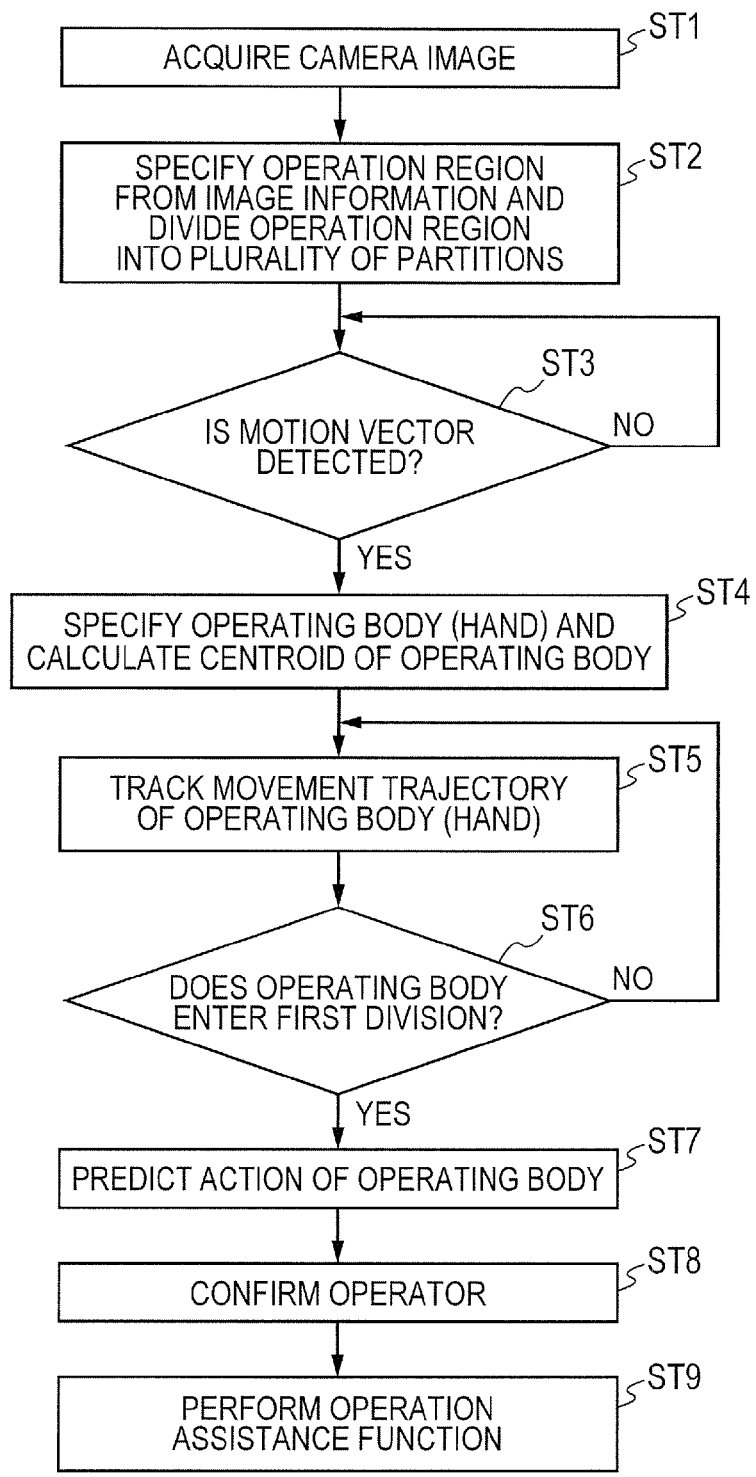
FIG. 6A is a flowchart illustrating steps from acquisition of image information of the CCD camera (imaging element) to execution of operation assistance on the operation panel according to an exemplary embodiment.

First, in step ST1 illustrated in FIG. 6A, the image information of the CCD camera 11 may be acquired by the image information detection unit 22 illustrated in FIG. 2. In step ST2, the region regulation unit 23 illustrated in FIG. 2 may specify the action detection region 30 from the image information and also may divide the inside of the action detection region 30 into the plurality of partitions 31 and (see FIGS. 5A to 5D).

The entire screen 34 illustrated in FIG. 3 may also be determined as the action detection region 30. However, at least a region on the front side of the operation panel 18 may be specified as the action detection region 30 in order to reduce the amount of computation (amount of calculation).

Subsequently, in step ST3 illustrated in FIG. 6A, the calculation unit 24 illustrated in FIG. 2 may perform detection of the motion vector. The detection of the motion vector is illustrated in only step ST3 illustrated in FIG. 6A, but whether the motion vector is present is normally detected between a previous frame and a current frame.

In step ST4 illustrated in FIG. 6A, an operating part (hand) may be specified, as illustrated in FIGS. 5A to 5D, and the calculation unit 24 illustrated in FIG. 2 may calculate the centroid G of the operating part (hand).

In an exemplary embodiment, a hand part may be used as the operating part, as illustrated in FIGS. 5A to 5D. A flowchart up to the estimation of the hand part and the calculation of the centroid G of the hand is illustrated in FIG. 6B.

Figure 6B:
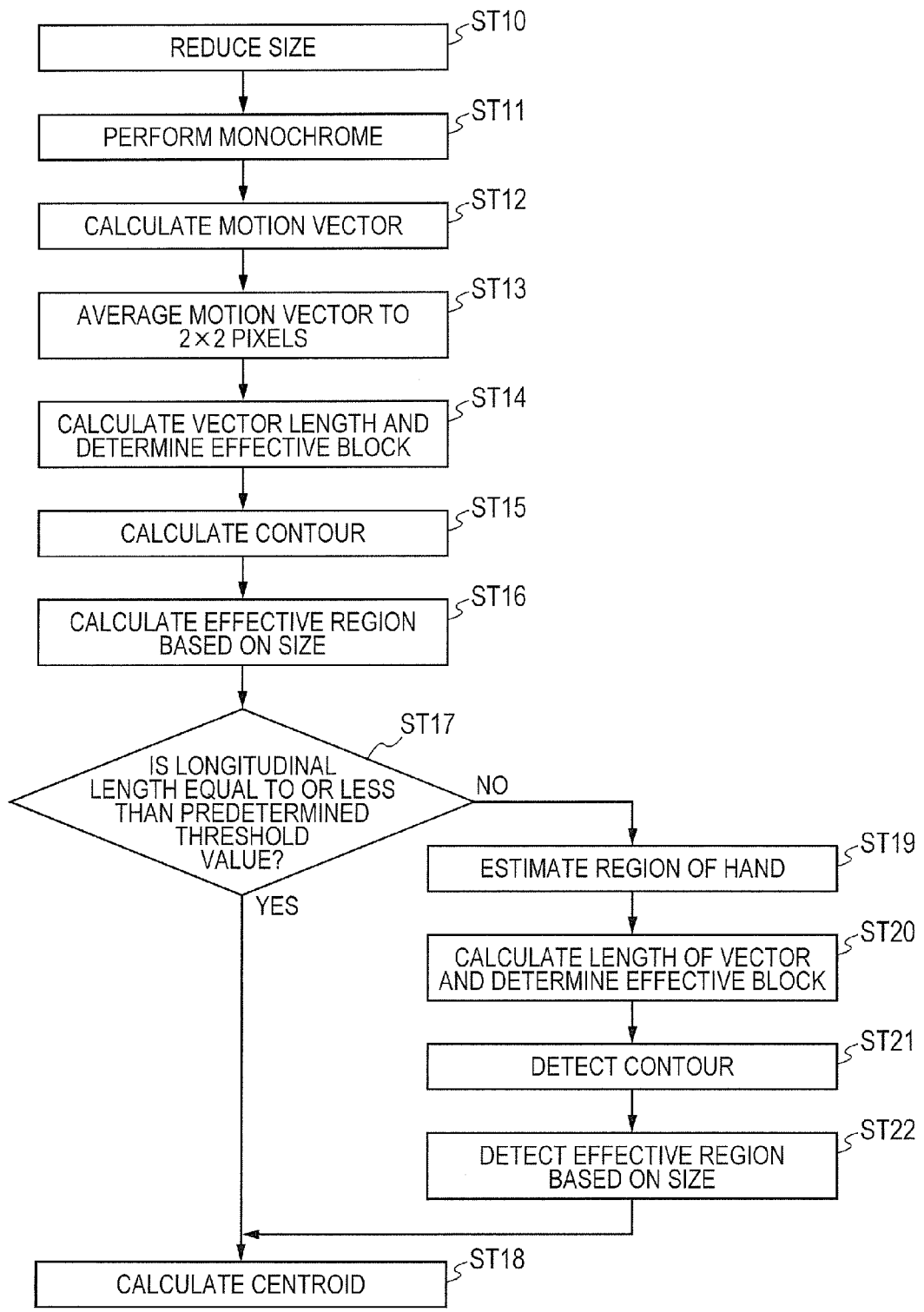
FIG. 6B is a flowchart illustrating the step of estimating particularly a part of the hand according to an exemplary embodiment.

In FIG. 6B, the image may be acquired by the CCD camera 11, as illustrated in FIG. 6A. Thereafter, the size of the image may be reduced in step ST10, and then the process of converting the image into a monochrome image may be performed in step ST11 to perform the recognition process. Subsequently, in step ST12, for example, the motion vector may be detected by calculating the optical flow using a previous frame and a current frame. The detection of the motion vector is also illustrated in step ST3 of FIG. 6A. In FIG. 6B, when the motion vector is detected, the process proceeds to subsequent step ST13.

In step ST13, the motion vector may be averaged to 2×2 pixels. For example, 80×60 blocks are obtained at this time.

Next, in step ST14, a vector length (amount of movement) may be calculated for each block. When the vector length is greater than a determined value, the block is determined as a block having effective motion.

Subsequently, as illustrated in FIG. 5A, the contour 42 of the operating part may be detected (step ST15).

Next, in step ST16, the size of each portion of the operating part may be calculated from the contour 42 and the region with a value equal to or greater than the determined value is set as an effective region. A region circumscribed by the contour 42 may be detected within the effective region. As described with reference to FIG. 5B, for example, the XY coordinates forming the entire contour 42 may be investigated, the minimum and maximum values of the X coordinates are calculated, and the width (the length in the X direction) of the effective region may be reduced, as illustrated in FIG. 5C.

By doing so, the minimum rectangular region 43 circumscribed by the contour 42 may be detected. In step ST17, it may be determined whether the longitudinal length (Y1-Y2) of the minimum rectangular region 43 (effective region) may be equal to or less than the predetermined threshold value. When the longitudinal length of the minimum rectangular region 43 is equal to or less than the predetermined threshold value, the centroid G within the effective region may be calculated as illustrated in step ST18.

Conversely, when the longitudinal length (Y1-Y2) of the minimum rectangular region 43 (effective region) is equal to or greater than the predetermined threshold value in step ST17, the longitudinal length which is the lower limit size of the arm may be restricted within the predetermined length range from the Y1 side and an image is cut out (see FIG. 5D). Then, as illustrated in step ST19, the minimum rectangular region 43 circumscribed by the contour 42 may be detected in the cut-out image, and the region obtained by enlarging the minimum rectangular region 43 by a few pixels in all of the directions is set as the hand estimation region.

In step ST20 to step ST22, the same steps as step ST14 to step ST16 may be performed in the above-described hand estimation region. Thereafter, in step ST19, the center of the effective region may be determined as the centroid G of the hand 41.

As described above, the centroid G of the operating part (hand) may be calculated. Thereafter, in step ST5 illustrated in FIG. 6A, the movement trajectory of the operating part (hand) may be tracked. Here, the tracking of the movement trajectory can be obtained by the motion vector of the centroid G. The tracking refers to a state in which a motion of the hand entering the action detection region 30 may be continuously tracked. As described above, the movement trajectory can be tracked by the movement vector of the centroid G of the hand. However, the acquisition of the centroid G may be performed, for example, when the motion vector is detected by calculating the optical flow using a previous frame and a current frame. There is a temporal interval between the acquisitions of the centroid G. However, in this embodiment, the tracking may be performed in addition to the temporal interval between the acquisitions of the centroid G.

The tracking of the movement trajectory of the operating part may start when it is detected that the operating part enters the action detection region 30. After a while, for example, the tracking of the movement trajectory of the operating part may start after it is determined that the operating part reaches the vicinity of the boundary line 33 between the first partition 31 and the second partition 32. The start time of the tracking the movement trajectory can be arbitrarily determined. In an exemplary embodiment, the tracking of the movement trajectory may be assumed to start when it is determined that the operating part enters the action detection region 30.

Figure 7:
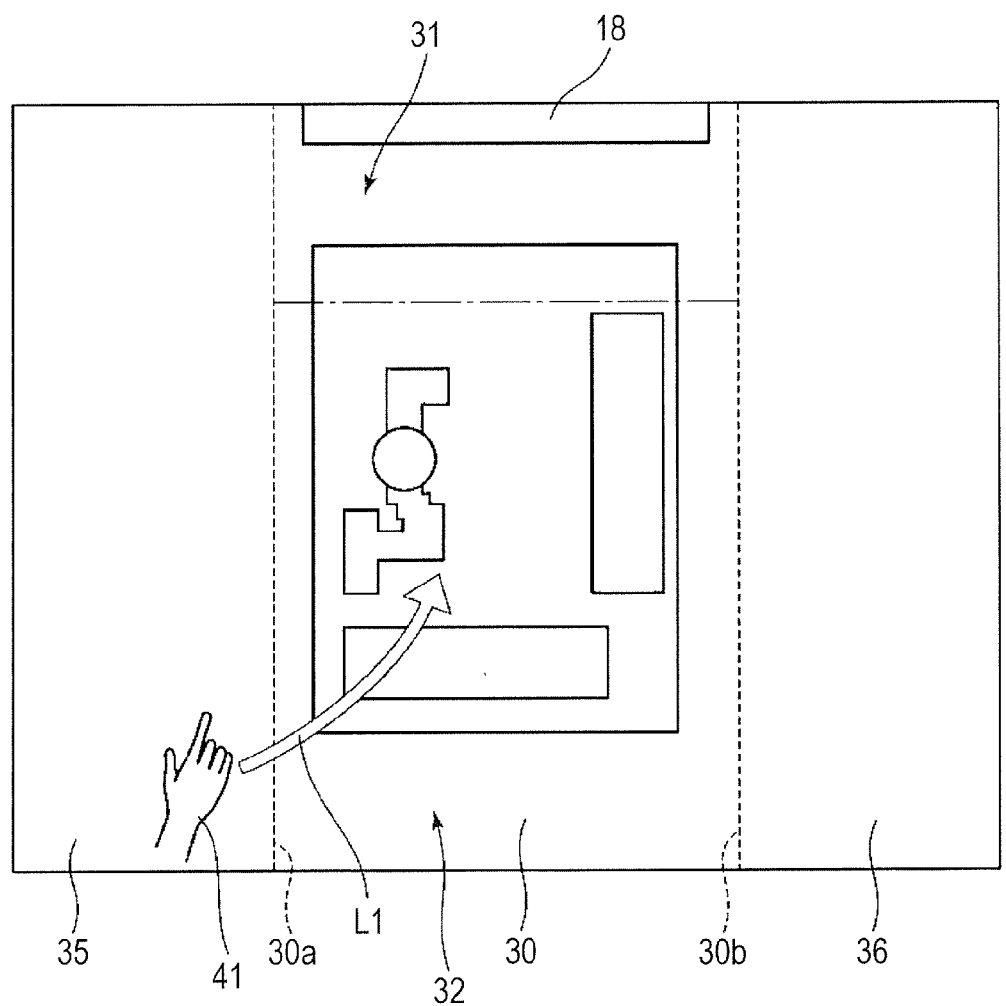
FIG. 7 is a schematic diagram illustrating movement trajectory of an operating part (hand) of a driver in an action detection region specified by the image information of the CCD camera according to an exemplary embodiment.

FIG. 7 illustrates a state in which a driver is now stretching his or her hand 41 in the direction of the operation panel 18 to operate the operation panel 18.

An arrow L1 illustrated in FIG. 7 indicates a movement trajectory (hereinafter, referred to as a movement trajectory L1) of the hand 41 within the action detection region 30.

As illustrated in FIG. 7, the movement trajectory L1 of the hand 41 is being moved in the direction of the first partition 31 within the second partition 32 more distant from the operation panel 18 between the plurality of partitions 31 and 32 of the action detection region 30.

In step ST6 illustrated in FIG. 6A, it may be detected whether the movement trajectory L1 enters the inside of the first partition 31 closer to the operation panel 18. When the movement trajectory L1 does not enter the inside of the first partition 31, the process may return to step ST5 and the movement trajectory L1 of the hand 41 may be continuously tracked according to the routine of step ST3 to step ST5 illustrated in FIG. 6A. Thus, although not illustrated in FIG. 6A, the routine of step ST3 to step ST15 may be normally operated during the action prediction even after the process returns to step ST5.

Figure 8:
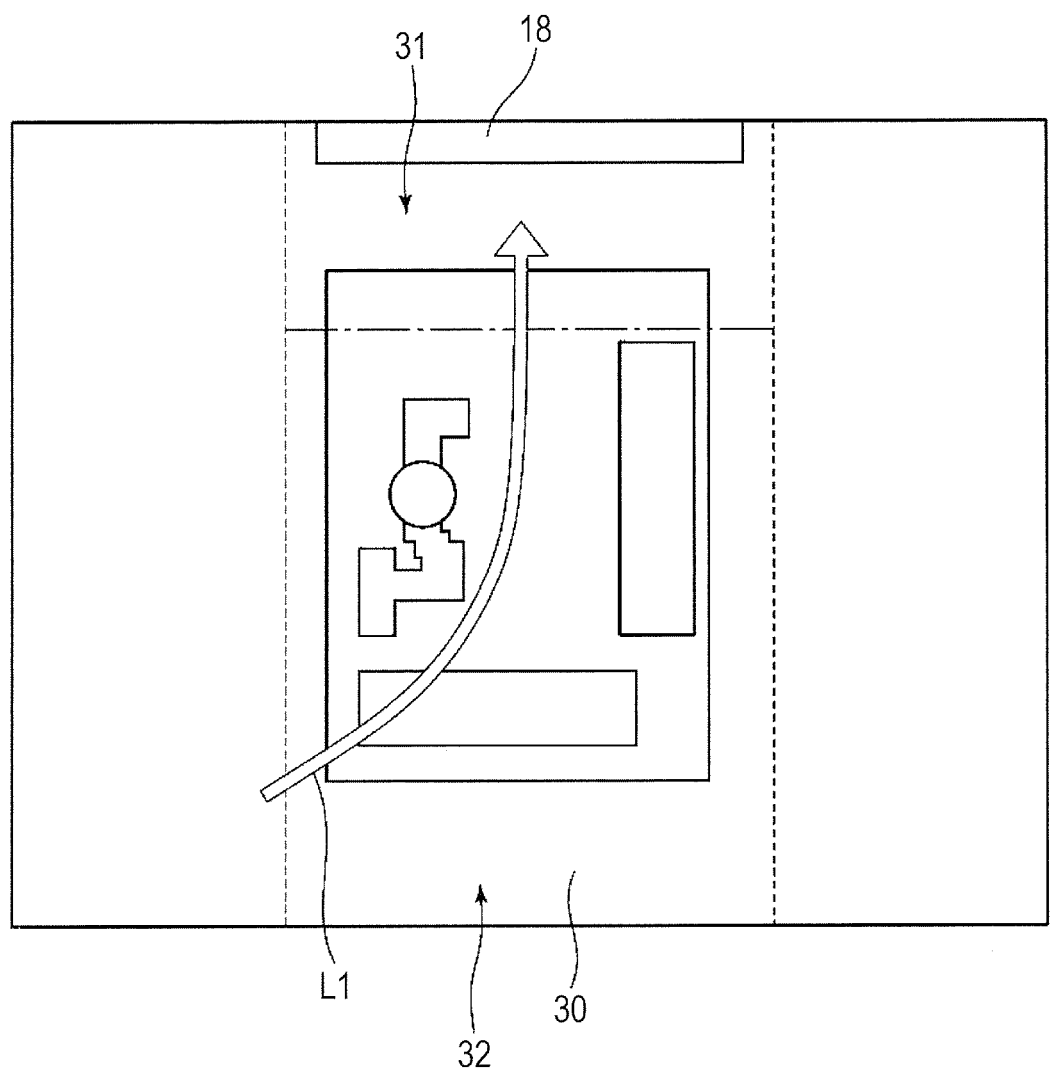
FIG. 8 is a schematic diagram illustrating a case in which the operating part enters a first partition close to the operation panel, when the movement trajectory of the operating part (hand) illustrated in FIG. 7 is tracked according to an exemplary embodiment.

As illustrated in FIG. 8, when the movement trajectory L1 of the hand 41 enters the inside of the first partition 31 closer to the operation panel 18 from the second partition 32, step ST6 illustrated in FIG. 6A is satisfied and the process proceeds to step ST7. Whether the movement trajectory L1 enters the inside of the first partition 31 can be detected by the calculation unit 24 illustrated in FIG. 2. Also, apart from the calculation unit 24, the control unit 21 may include a determination unit that determines whether the movement trajectory L1 enters the first partition 31.

In step ST7 illustrated in FIG. 6A, the action prediction of the hand (operating part) 41 may be performed based on the movement trajectory L1. That is, when the movement trajectory is not changed and the movement trajectory L1 arriving from the second partition 32 to the first partition 31 may be maintained, the action prediction unit 25 illustrated in FIG. 2 may predict a position at which the hand 41 reaches the action detection region 30 (a side of the screen 18a of the operation panel 18 which the hand 41 reaches). By further dividing the partition may be further divided according to the position of an operating member such as the shift operating part 16 present within the action detection region 30, various measures can be taken when it is predicted that the shift operating part 16 is about to be operated. For example, the shift operating part 16 can be illuminated by separately installed illumination means.

In FIG. 8, the movement trajectory L1 of the hand 41 may be moved from the second partition 32 of the action detection region 30 to the first partition 31. However, for example, as illustrated in FIG. 9, a movement trajectory L2 of the hand 41 may directly enter the first partition 31 without passing through the second partition 32 of the action detection region 30.

Figure 10:
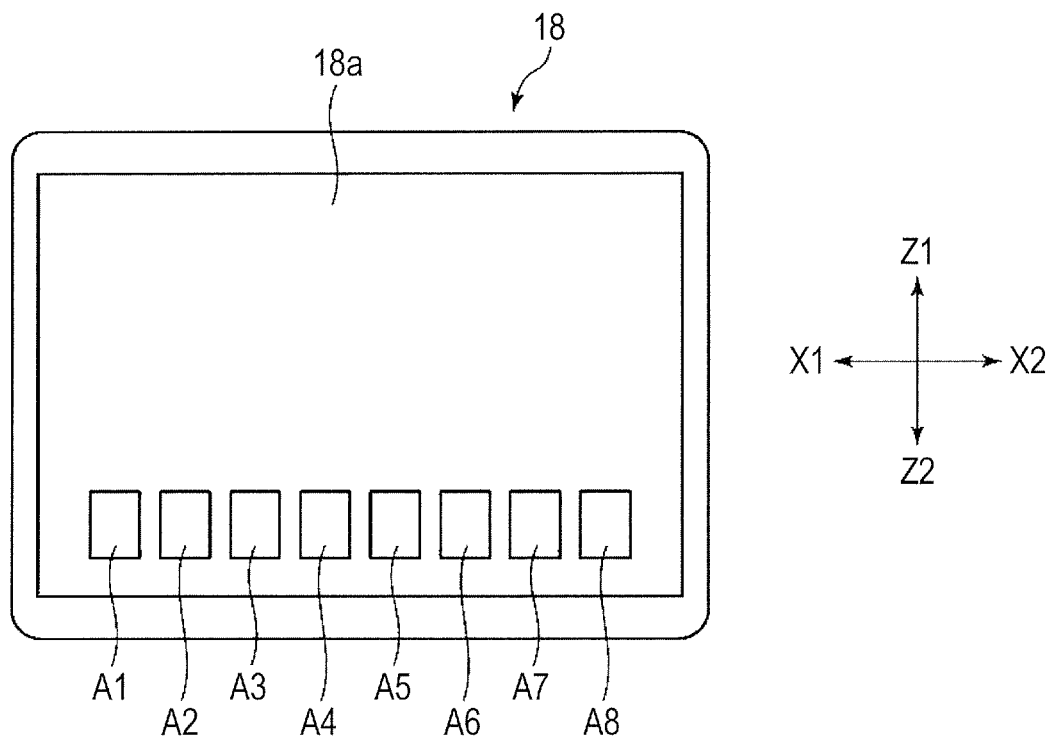
FIG. 10 is a schematic diagram illustrating an input operation surface of the operation panel according to an exemplary embodiment.

FIG. 10 illustrates the screen 18a of the operation panel 18. As illustrated in FIG. 10, a plurality of icons A1 to A8 may be arranged in a lateral direction (X1-X2) perpendicular to a height direction (Z1-Z2) of the operation panel 18 in the lower side of the screen 18a. A portion above each of the icons A1 to A8 is a portion in which a map may be displayed or music reproduction may be displayed in the car navigation device.

Unlike the arrangement of the icons A1 to A8 illustrated in FIG. 10, for example, a configuration may be realized in which the icons A1 to A8 are arranged in the height direction (Z1-Z2). Also, for example, a configuration may be realized in which some of the icons are arranged in the lateral direction and the remaining icons are arranged in the height direction.

Figure 9:
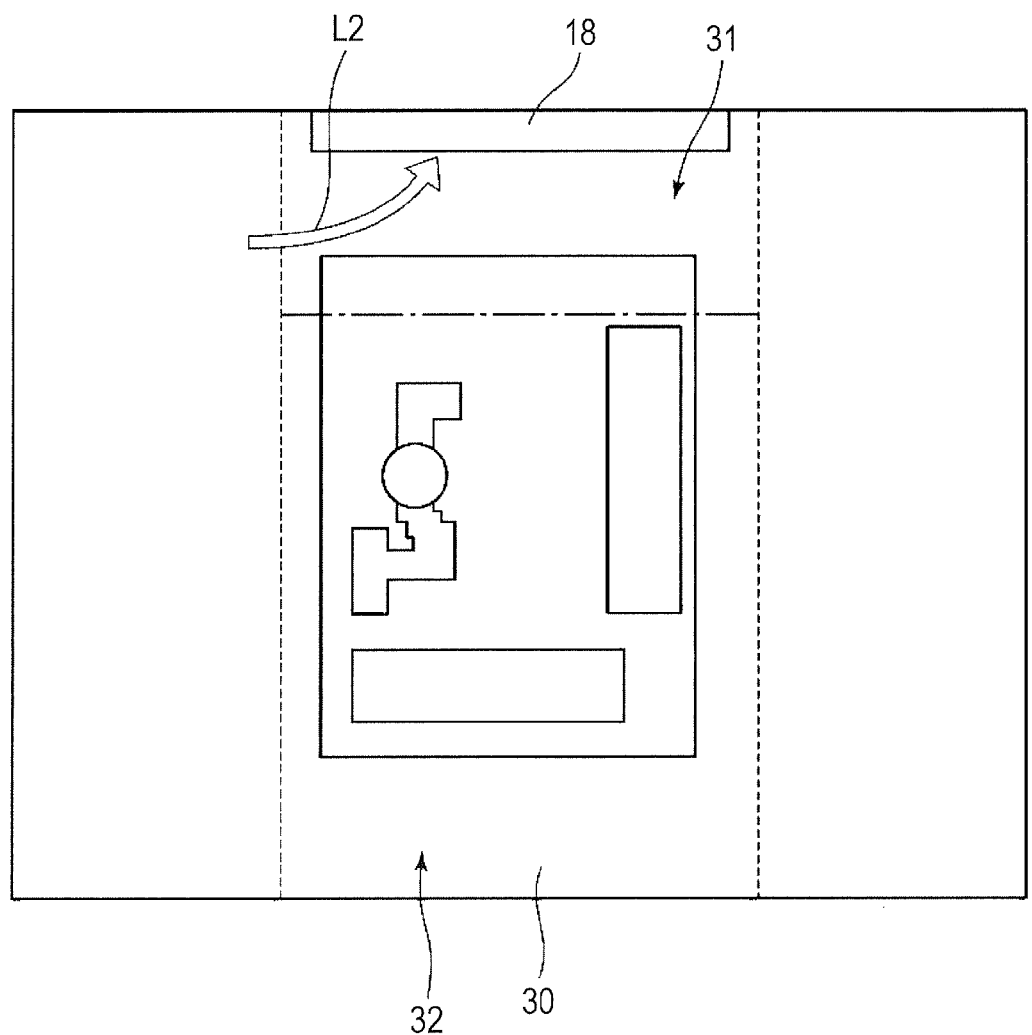
FIG. 9 is a schematic diagram illustrating a case in which an operating part (hand) of a driver directly enters the first partition close to the operation panel according to an exemplary embodiment.

However, in the configuration in which the icons are arranged in the height direction, when the movement trajectory L1 or L2 of the hand 41 enters the first partition 31 as in FIG. 8 or 9 or when the movement trajectory L1 is located inside the second partition 32 as in FIG. 7, it may be necessary to detect a height position of the hand 41. Here, the method of calculating the height position of the operating part may not be limited. However, for example, the height position of the hand 41 can be estimated based on the sizes of the minimum rectangular regions 43 and 44 in which the contour 42 of the hand 41 is entered in FIGS. 5C and 5D. That is, as illustrated in FIG. 3, the screen 34 shown by the CCD camera 11 may be planar and only the planar information can be obtained. Therefore, in order to know the height position of the hand 41, the hand 41 can be detected at a higher position (closer to the CCD camera 11) as the areas of the minimum rectangular regions 43 and 44 may be larger. At this time, in order to calculate the height position of the hand 41 by an area change with respect to a reference size (for example, the size of the hand 41 when the center of the operation panel 18 is operated) of the hand 41, initial setting may be performed to measure the size of the reference. Thus, it may be possible to estimate a height position at which the movement trajectory of the hand 41 is present.

Figure 11A:
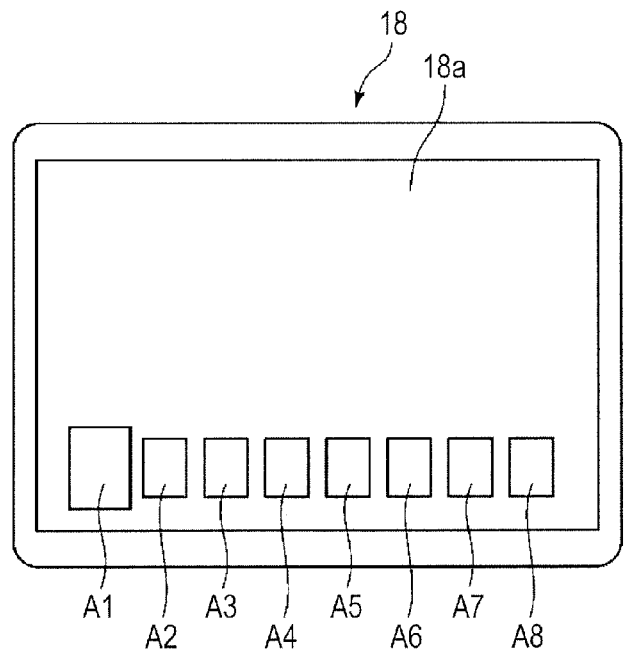
FIG. 11A is a schematic diagram illustrating a form of the operation assistance on the operation panel and an expanded display state of an icon scheduled to be subjected to an input operation of the operating part based on operation prediction of the operating part according to an exemplary embodiment.

Now, assume that an input operation on the icon A1 illustrated in FIG. 10 is predicted based on the movement trajectory of the hand 41 (operating part). Then, the action prediction information may be transmitted to the operation assistance function unit 26 and an operator may be confirmed in step ST8 illustrated in FIG. 6A. Thereafter, as illustrated in step ST9 of FIG. 6A, the operation assistance on the operation panel 18 may be performed. For example, as illustrated in FIG. 11A, the icon A predicted to be subjected to the input operation is displayed in an enlarged manner before a finger comes into contact with the screen 18a. This is one display form in which the icon A1 predicted to be subjected to the input operation through the action prediction is highlighted.

Figure 11B:
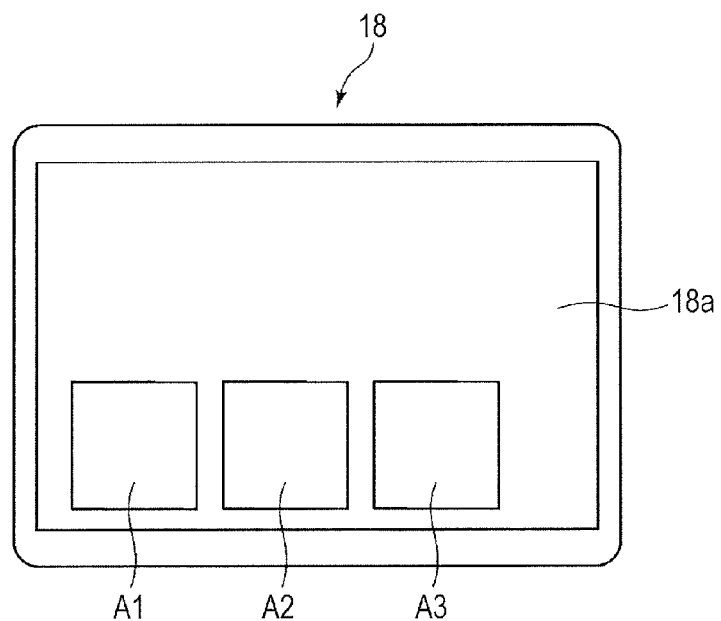
FIG. 11B is a schematic diagram illustrating an expanded display state of the icon as a form different from that of FIG. 11A according to a modification example of FIG. 11A according to an exemplary embodiment.

As in FIG. 11B, the icons A1 and A3 located in the vicinity (both sides of the icon A2) of the icon A2 can be displayed in an enlarged manner together with the icon A2 and the remaining icons A4 to A8 can also be erased from the screen, when an input operation on the icon A2 illustrated in FIG. 10 is predicted based on a movement trajectory of the hand 41 (operating part). Thus, in the configuration in which only a plurality of icons adjacent to each other centering an action predicted destination is enlarged, the icons can be more enlarged and displayed, and thus an erroneous operation can be prevented. In particular, by displaying and enlarging only portions of a plurality of icons predicted to be subjected to an input operation by a driver while a vehicle travels, an operation mistake, such as a case in which the driver erroneously presses down a nearby icon, can be prevented even when the vehicle is shaken.

Figure 12:
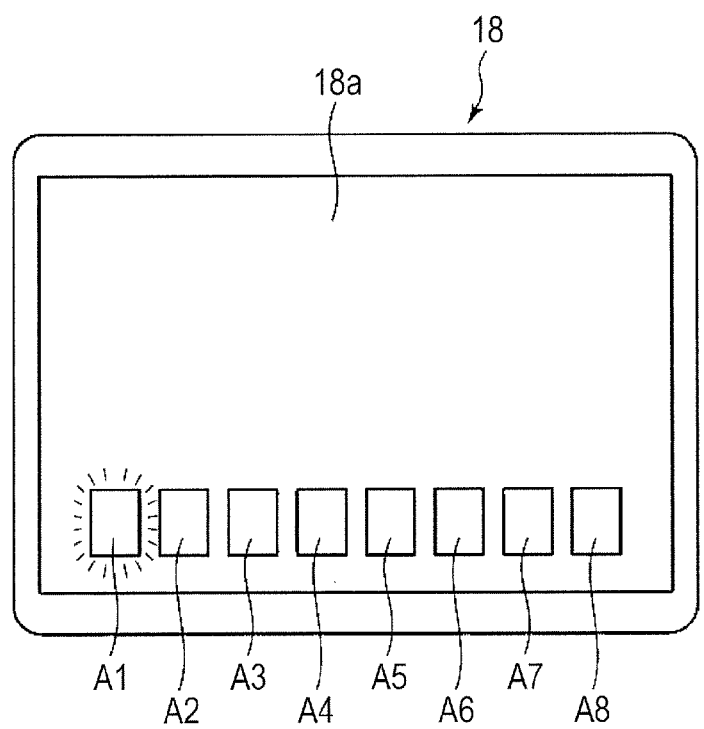
FIG. 12 is a schematic diagram illustrating a form of the operation assistance on the operation panel and a lighting state of an icon scheduled to be subjected to an input operation of the operating part based on operation prediction of the operating part according to an exemplary embodiment.
Figure 13:
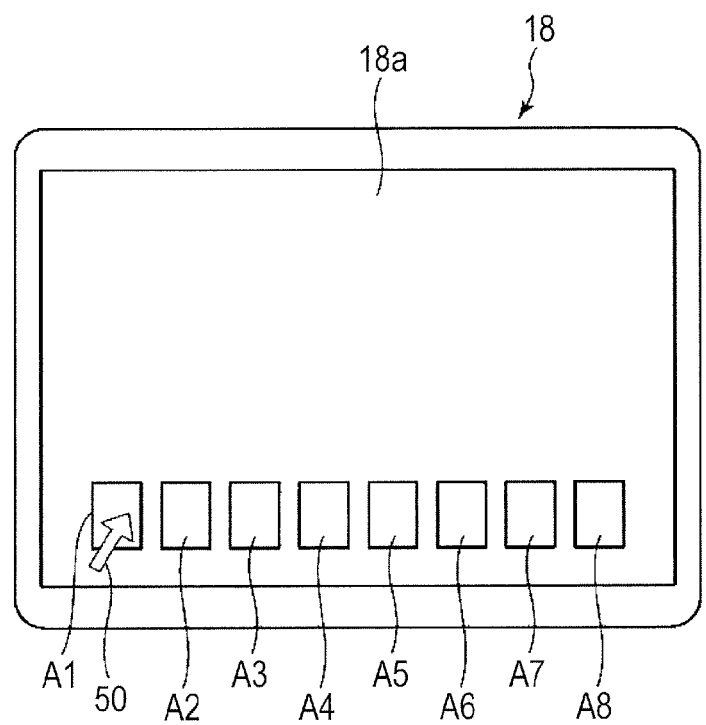
FIG. 13 is a schematic diagram illustrating a form of the operation assistance on the operation panel and a state in which a cursor is displayed in an overlapping manner on an icon scheduled to be subjected to an input operation of the operating part based on operation prediction of the operating part according to an exemplary embodiment.
Figure 14:
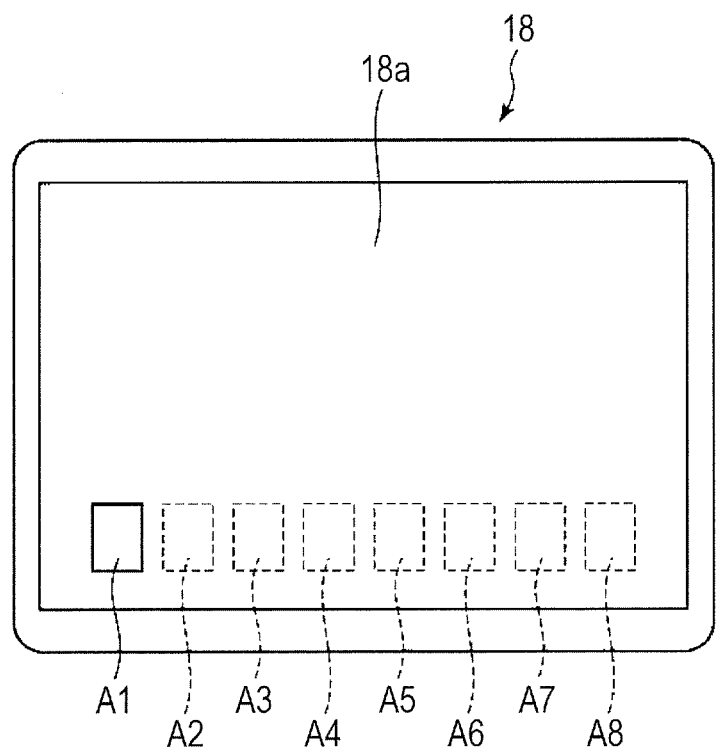
FIG. 14 is a schematic diagram illustrating a form of the operation assistance on the operation panel and a state in which icons other than an icon scheduled to be subjected to an input operation of the operating part are displayed in a gray-out manner based on operation prediction of the operating part according to an exemplary embodiment.

In an exemplary embodiment, besides FIGS. 11A and 11B, the icon A1 may be lighted or blinked, as illustrated in FIG. 12. Also, a cursor display 50 or another display may overlap the icon A1 so that it is indicated that the icon A1 is selected, as illustrated in FIG. 13. The icons A2 to A8 other than the icon A1 also may be displayed in a gray-out manner so that the fact that only the icon A1 can be input is highlighted and displayed, as illustrated in FIG. 14.

Figure 15:
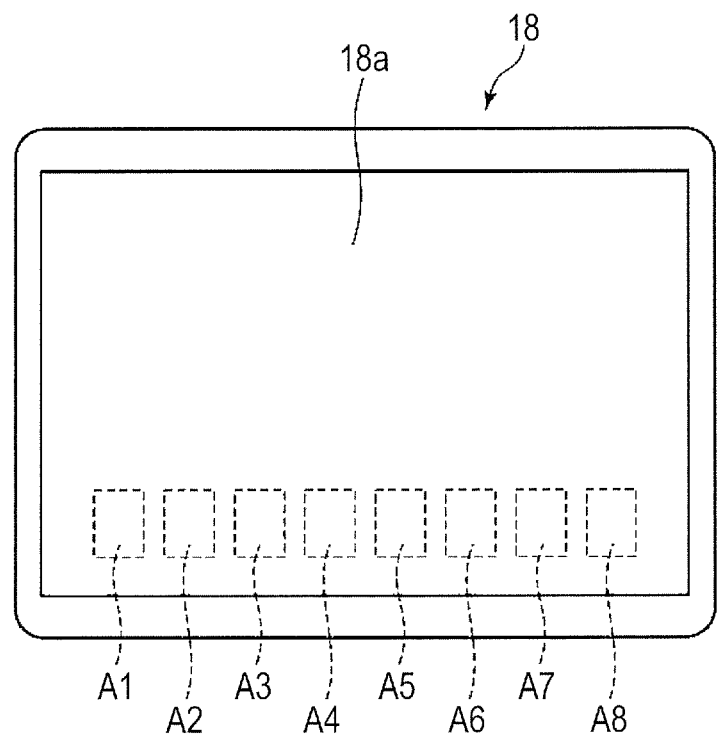
FIG. 15 is a schematic diagram illustrating a form of the operation assistance on the operation panel and a state in which all of the icons on the operation panel are displayed in a gray-out manner according to an exemplary embodiment.

As illustrated in FIG. 6A, in step ST8, the operator may be confirmed. However, for example, when it is identified that the operator is the driver, all of the icons A1 to A8 on the screen 18a of the operation panel 18 may be displayed in the gray-out manner as one form of the operation assistance in order to improve safety while the vehicle travels, as illustrated in FIG. 15. In the form illustrated in FIG. 15, for example, when a traveling speed of the vehicle is calculated from a vehicle speed sensor (not illustrated) and the traveling speed is equal to or greater than a predetermined speed and it is recognized that the operator is the driver, control can be performed such that all of the icons A1 to A8 can be displayed in the gray-out manner, as illustrated in FIG. 15.

The control unit 21 can easily and appropriately determine whether the operator is the driver or a passenger other than the driver by the tracking of the movement trajectory L1 from the entrance position on the boundary lines (sides) 30a and 30b between the action detection region 30 and both left and right regions 35 and 36.

That is, as illustrated in FIG. 7, it is identified that the hand 41 is the hand of the driver (due to the left-hand handle in the form illustrated in FIG. 1) by detecting that the hand 41 enters the inside of the action detection region 30 from the boundary line 30a between the action detection region 30 and the left region 35 on the driver seat side.

Figure 16:
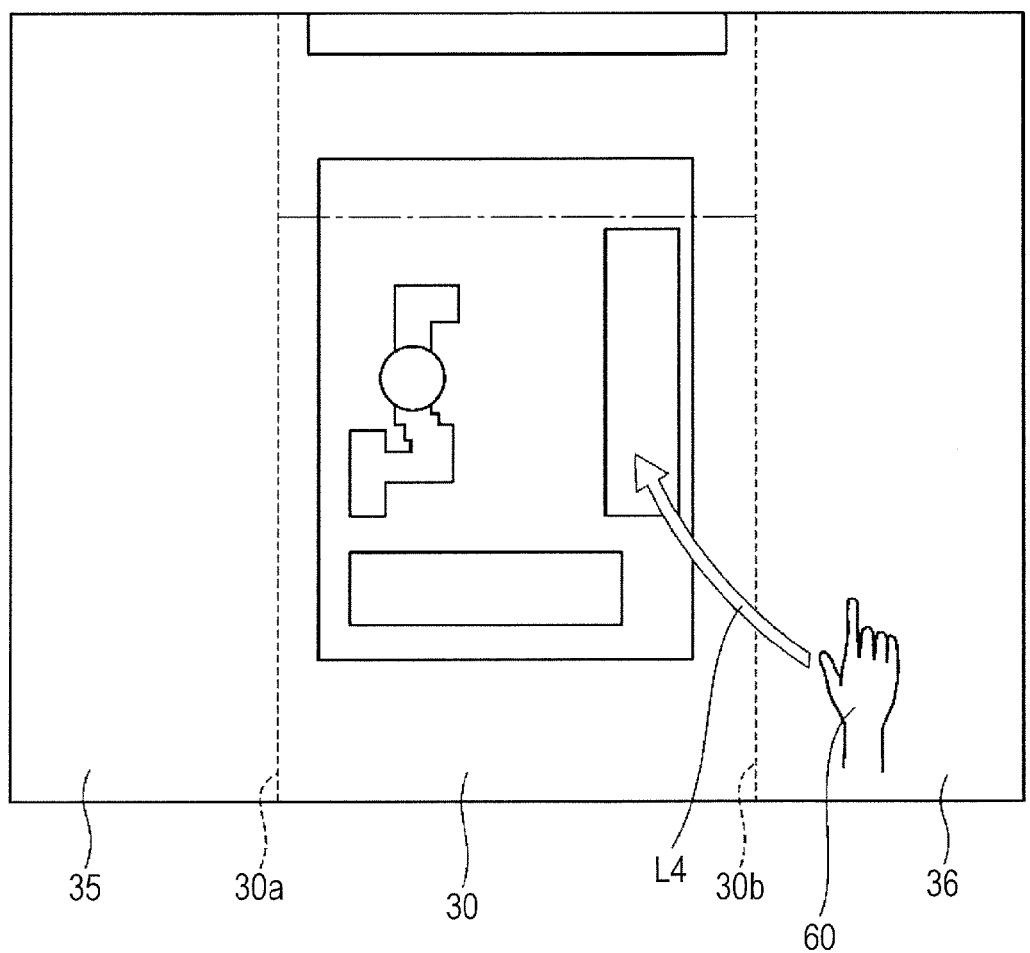
FIG. 16 is a schematic diagram illustrating movement trajectory of an operating part (hand) of a passenger (operator) on a front passenger seat within an action detection region specified by image information of the CCD camera according to an exemplary embodiment.

As illustrated in FIG. 16, it can be identified that a hand 60 is the hand of a passenger on the front passenger seat side, when a movement trajectory L4 of the hand 60 extends from the boundary line 30b between the action detection region 30 and the right region 36 on the front passenger seat to the inside of the action detection region 30.

Figure 17:
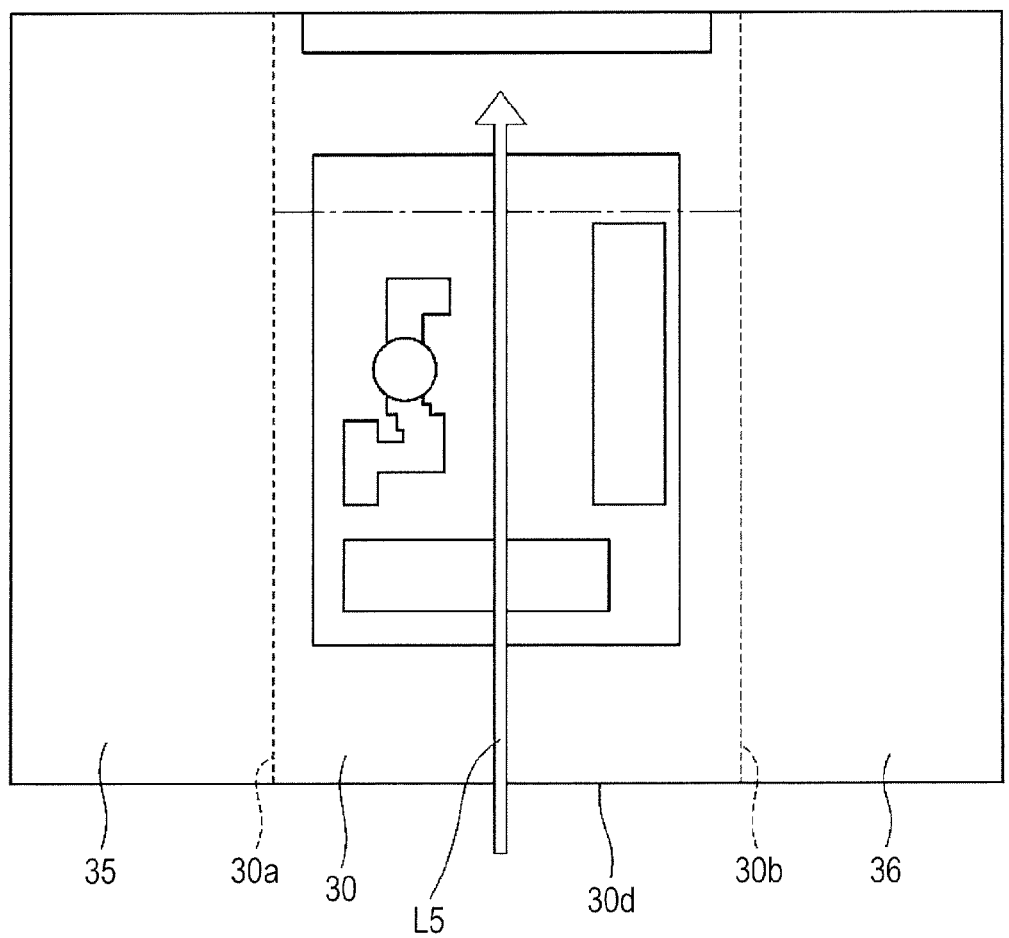
FIG. 17 is a schematic diagram illustrating movement trajectory of an operating part (hand) of a passenger (operator) on a rear seat within an action detection region specified by image information of the CCD camera according to an exemplary embodiment.

Also, as illustrated in FIG. 17, it can be identified that the operator is a passenger on a rear seat, when a movement trajectory L5 enters from the position of the side 30d remotest from the operation panel 18 in the action detection region 30 to the inside of the action detection region 30.

Figure 18:
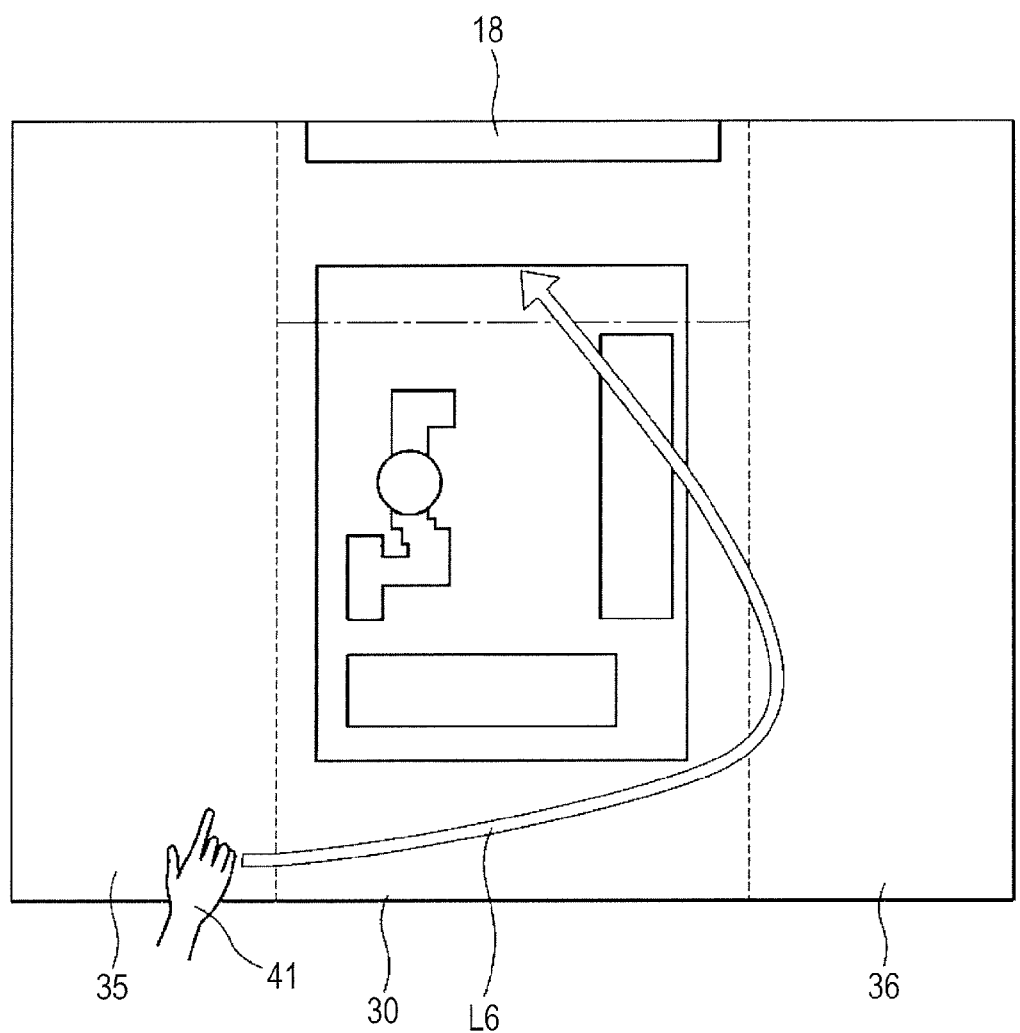
FIG. 18 is a schematic diagram illustrating an example in which movement trajectory of an operating part (hand) of a driver different from the driver of FIG. 8 is tracked according to an exemplary embodiment.

In an exemplary embodiment, by tracking a movement trajectory of an operating part, that is, by tracking a movement trajectory L6 of a hand 41 (operating part), as illustrated in FIG. 18, it can be identified that the operator is the driver even when the driver attempts to operate the operation panel 18 by turning his or her arm to the front passenger seat side, as illustrated in FIG. 18.

In an exemplary embodiment, the input operation function may be differently controlled depending on whether the operator is the driver or a passenger other than the driver. For example, when a passenger on the front passenger seat is the operator, the control may be performed such that the icon A1 illustrated in FIGS. 11A to 14 is highlighted and displayed. When the driver is the operator, the control may be performed such that all of the icons A1 to A8 illustrated in FIG. 15 are displayed in the gray-out manner. Thus, the safety while the vehicle travels can be improved. When it is identified that a passenger on a rear seat is the operator, the safety can be improved, for example, by displaying all of the icons A1 to A8 in the gray-out manner, as in the case in which the driver is the operator. Thus, the operation position of the operation panel 18 may be highlighted and displayed only when it is determined that the operator is the passenger on the front passenger seat.

When it is identified in step ST8 illustrated in FIG. 6A that the operator is the driver, the restriction on the input operation compared to the case in which the operator is the passenger on the front passenger seat is suitable for improving the safety. For example, as described above, when the vehicle is traveling at a speed equal to or greater than a predetermined speed, control can be considered to be performed such that the input operation is invalidated by displaying all of the icons in the gray-out manner.

As illustrated in FIGS. 11A and 11B, even when the icon A1 is enlarged and displayed, comfortable operability and the safety can be improved by further enlarging and displaying the icon A1 in the case in which the drive is the operator than the case in which the passenger on the front passenger seat is the operator. This case is also an example in which the control is performed such that the input operation function differs depending on whether the operator is the driver or a passenger other than the driver.

Figure 19:
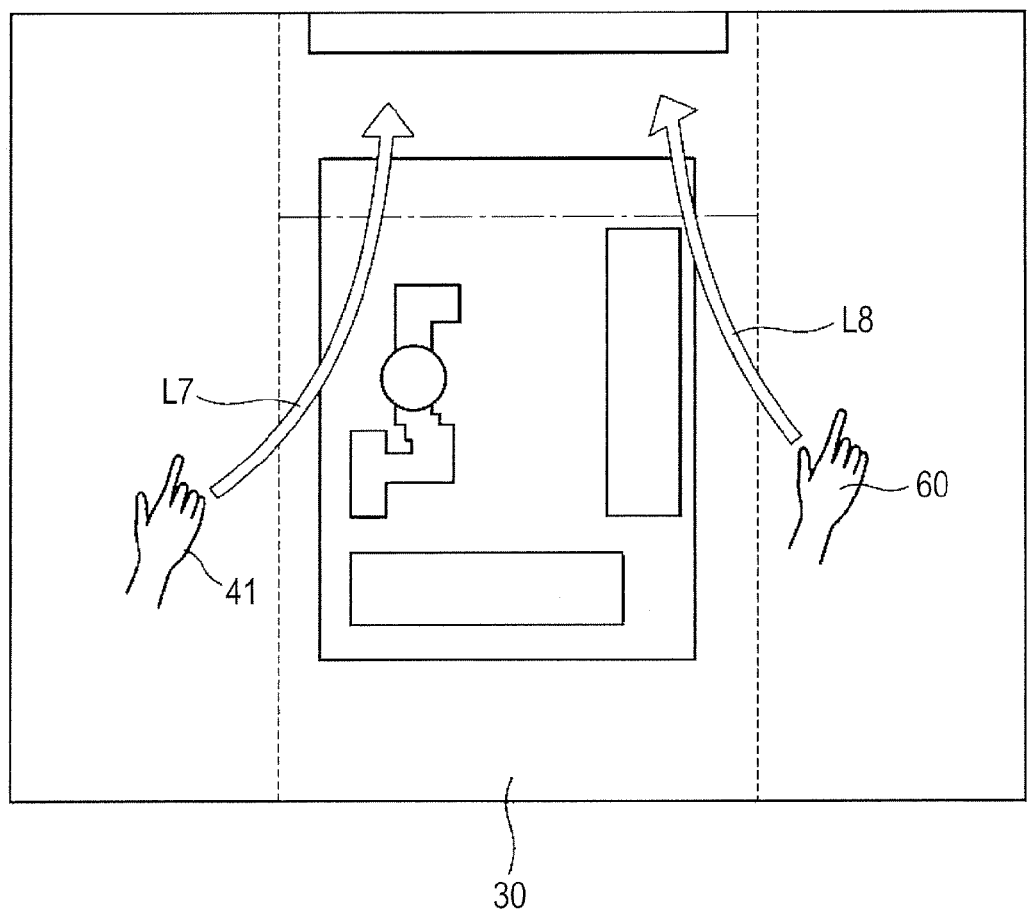
FIG. 19 is a schematic diagram illustrating a state in which both operating parts (hands) of both a driver and a passenger on the front passenger seat enter an action detection region according to an exemplary embodiment.

As illustrated in FIG. 19, when both of a movement trajectory L7 of the hand 41 of the driver and a movement trajectory L8 of the hand 60 of the passenger on the front passenger seat are detected within the first partition 31 of the action detection region 30, a method of performing the operation assistance by preferring the action prediction of the passenger on the front passenger seat may be suitable for improving the safety while the vehicle travels.

The operation assistance on the operation panel 18 also may include, for example, a form in which an input is automatically turned on or off even when the operation panel 18 is not touched based on action prediction of an operating part.

As illustrated in FIGS. 11A to 14, when the icon A1 predicted to be subjected to an input operation is highlighted and displayed and then the hand 41 further approaches the operation panel 18, the input operation on the icon A1 can be confirmed before the finger is touched on the icon A1.

In an exemplary embodiment, the example has been given in which the icon is highlighted and displayed. However, a display part other than the icon also may be used. For example, a predicted operation position may be highlighted and displayed.

Figure 20:
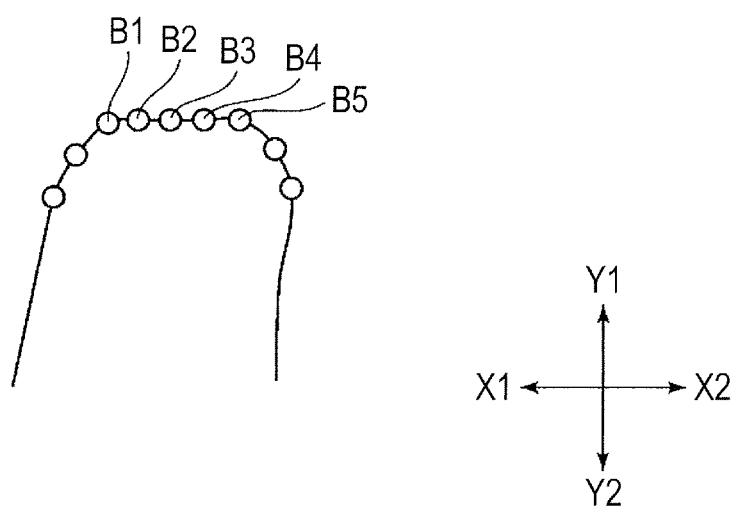
FIG. 20 is a schematic diagram illustrating an algorithm configure to track the position of a finger according to an exemplary embodiment.

FIG. 20 is a diagram illustrating a method of detecting a finger. First, the coordinates of the contour 42 of the hand 41 in FIG. 5B may be obtained, and points B1 to B5 located most closely in the Y1 direction may be listed up, as illustrated in FIG. 20. Since the Y1 direction indicates the direction of the operation panel 18, the points B1 to B5 located most closely in the Y1 direction may be predicted to be a front end of the finger. Of the points B1 to B5, the point B1 located most closely to the X1 side and the point B5 located to be the most close to the X2 side may be obtained. Then, the coordinates (here, the position of the point B3) of the middle of the points B1 and B5 may be predicted as the position of the finger. In this embodiment, control can also be performed such that the action prediction is performed by setting a finger as an operating part and tracking the movement trajectory of the finger. By using the movement trajectory of the finger, more detailed action prediction can be performed.

Determination of a right hand and a left hand, determination of the front and back of a hand, or the like may be performed.

Even when an operating object is stopped within the action detection region 30, a movement trajectory of the operating part can be immediately tracked, in spite of the fact that movement of the operating part subsequently starts, by frequently acquiring the stop state by a centroid vector or the like or maintaining the centroid G in the stop state for a predetermined time.

The input device 20 according to an embodiment may include the operation panel 18 that is installed inside a vehicle and is operated by an operating part; the CCD camera (imaging element) 11 that is disposed inside the vehicle to image at least the front side of the operation panel 18; and the control unit 21 that predicts an action of an operating part on the operation panel 18 based on the image information of the CCD camera 11 and performs the operation assistance.

In an exemplary embodiment, the input device 20 may include the control unit 21 capable of predicting an action of the operating part on the operation panel 18 based on the image information imaged by the CCD camera 11. The operation assistance on the operation panel 18 can be performed based on the action prediction of the operating part. Accordingly, since the operation assistance can be performed at a front position at which an input operation is performed on the operation panel 18, it may be possible to obtain operability different from that of the related art, quick operability, and comfortable operability.

Since the input device 20 according to an exemplary embodiment may be installed inside a vehicle, the safety can be improved due to the above-described fast operability and comfortable operability, the operation restriction, or the like.

In an exemplary embodiment, the action prediction of the operating part is performed, the input operation control may be performed based on the action prediction. The input operation control is not performed using a key input as a trigger, as in Japanese Unexamined Patent Application Publication No. 2005-274409, and an unnecessary action can be omitted compared to the related art, which also results in an improvement in the above-described safety.

In an exemplary embodiment, the calculation unit 24 of the control unit 21 illustrated in FIG. 2 may track a movement trajectory of an operating part. However, the tracking of a movement trajectory is not essential, as long as an action of an operating part can be predicted. For example, when it is determined that an operating part is located, for example, in the vicinity of the middle of the first partition 31 illustrated in FIG. 3, it may be thereafter predicted that the operating part performs an input operation on the vicinity of the middle of the operation panel 18 and the operation assistance such as highlighting display of an icon in the vicinity of the middle of the operation panel 18 can be performed. In particular, it may be easy to perform the action prediction by dividing the first partition 31 in more detail, and thus the operation assistance on the operation panel 18 can be performed based on the action prediction.

However, by tracking a movement trajectory of an operating part, it may be easy to perform the action prediction and the action prediction with high accuracy can be performed. Therefore, the action prediction may be performed based on the tracking of the movement trajectory of the operating part.

In an exemplary embodiment, an operation position at which the action is predicted on the operation panel 18 may be highlighted and displayed through the operation assistance. For example, a display part typified by an icon may be highlighted and displayed. As illustrated in FIG. 10, the icons A1 to A8 may be arranged in the lateral direction (X1-X2) of the operation panel 18. Thus, by arranging the icons in the lateral direction of the operation panel 18, it may not be necessary to detect the height position of the operating part. Therefore, an action of the operating part can be predicted easily, and thus the operation assistance can be performed with high accuracy.

In an exemplary embodiment, the control unit 21 may specify the action detection region 30 divided into the plurality of partitions 31 and 32 to the front side of the operation panel 18 based on the image information of the CCD camera 11, predict the action based on entrance of the operating part into the first partition 31 located on the side of the operation panel 18 in the action detection region 30, and perform the operation assistance. Thus, control can be performed easily such that the timing at which the operation assistance is performed may be substantially uniform. The load on the control unit 21 performing the operation assistance can be reduced by performing the operation assistance based on the entrance of the operating part into the first partition 31 close to the operation panel 18. Thus, it may be possible to improve the accuracy with which the operation assistance is performed.

In an exemplary embodiment, the control unit 21 may be able to identify whether the operator on the operation panel 18 is the driver or a passenger other than the driver based on an entrance position of the operating part into the action detection region 30, and may perform control such that the operation assistance on the operation panel 18 differs according to the operator. In this case, for example, only when it is identified that the operator is the passenger on the front passenger seat, the control may be performed such that the operation assistance is performed. The input operation on the operation panel 18 may be restricted more when it is identified that the operator is the driver than when the operator is the passenger on the front passenger seat. When it is identified that the operator is either of the driver and the passenger on the front passenger seat, the operation assistance may be performed by preferring the action prediction of the passenger on the front passenger seat. Thus, the safety while the vehicle travels can be improved.

In an exemplary embodiment, the height position of the operating part may be identified, the action on the operation panel 18 of the operating part may be configured to be predicted based on the height position of the operating part, and the operation assistance may be performed.

It should be understood by those skilled in the art that various modifications, combinations, sub-combinations and alterations may occur depending on design requirements and other factors insofar as they are within the scope of the appended claims of the equivalents thereof.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. An input device comprising:
   an operation panel installed inside a vehicle and capable of being operated by an operating part;
   an imaging element disposed inside the vehicle to image at least a front side of the operation panel; and
   a control unit that predicts an action of the operating part based on image information of the imaging element and performs operation assistance on the operation panel,
   wherein an operation position at which the action is predicted on the operation panel is highlighted and displayed by the operation assistance of the control unit.

2. The input device according to claim 1, wherein display parts are displayed on the operation panel and the display part located at the operation position is highlighted and displayed by the operation assistance of the control unit.

3. The input device according to claim 2,
   wherein the plurality of display parts are arranged on the operation panel, and
   wherein, when the operating part approaches one of the display parts, the action is predicted and the display part which the operating part approaches is highlighted and displayed.

4. The input device according to claim 3, wherein the plurality of display parts are arranged in a lateral direction perpendicular to a height direction of the operation panel.

5. The input device according to claim 1, wherein the control unit specifies an action detection region divided into a plurality of partitions based on the image information, predicts the action based on entrance of the operating part into a predetermined partition located on a side of the operation panel in the action detection region, and performs the operation assistance.

6. The input device according to claim 1, wherein the control unit is able to identify whether an operator on the operation panel is a driver or a passenger other than the driver based on an entrance position of the operating part into the action detection region, and performs control such that the operation assistance on the operation panel differs according to the operator.

7. The input device according to claim 6, wherein the control unit performs the operation assistance only when the control unit identifies that the operator is a passenger on a front passenger seat.

8. The input device according to claim 6, wherein the control unit restricts an input operation on the operation panel more when identifying that the operator is the driver than when the operator is the passenger on the front passenger seat.

9. The input device according to claim 6, wherein, the control unit performs the operation assistance by preferring the action prediction of the passenger on the front passenger seat, when the control unit identifies that the operator is either of the driver and the passenger on the front passenger seat.

10. The input device according to claim 1, wherein the control unit is able to identify a height position of the operating part, and thus predicts the action on the operation panel of the operating part based on the height position of the operating part and performs the operation assistance.

11. The input device according to claim 1, wherein the action is predicted based on vector information regarding the operating part.

12. The input device according to claim 1, wherein the action is predicted by obtaining coordinates of a contour of a hand which is the operating part, calculating a position of a finger from the coordinates, and tracking a movement trajectory of the finger.

13. The input device according to claim 1, wherein the operation panel includes a screen and an enlarged icon is displayed on the screen.

14. The input device according to claim 13, wherein the enlarged icon is displayed on the screen and surrounding icons are erased from the screen.

15. The input device according to claim 1, wherein the operation panel includes a screen and a blinked icon is displayed on the screen.

16. The input device according to claim 1, wherein the operation panel includes a screen and a lighted icon is displayed on the screen.

17. The input device according to claim 1, wherein the operation panel includes a screen that displays a plurality of icons on the screen and an icon other than an icon to be subjected to action prediction is displayed on the screen in a grayed-out manner.

18. The input device according to claim 17, wherein all of the plurality of icons are displayed on the screen in a grayed-out manner when a predetermined condition is not satisfied.

* * * * *